United States Patent [19]

Stewart

[11] Patent Number: 5,791,331
[45] Date of Patent: Aug. 11, 1998

[54] CONVERTIBLE BARBECUE SUPPORT FRAME

[75] Inventor: Daniel M. Stewart, Greeneville, Tenn.

[73] Assignee: MECO Corporation, Greeneville, Tenn.

[21] Appl. No.: 730,358

[22] Filed: Oct. 15, 1996

Related U.S. Application Data

[60] Provisional application No. 60/005,435 Oct. 13, 1995.

[51] Int. Cl.$^6$ ............................. A47J 37/00; F24C 3/00
[52] U.S. Cl. ................ 126/41 R; 126/25 R; 126/276; 248/129; 280/47.19; 280/47.35
[58] Field of Search .......................... 126/41 R, 50, 126/25 R, 276, 40, 304 R, 305, 306, 30, 29; 280/47.19, 47.35, 47.33; 211/189, 182, 133.6; 248/129

[56] References Cited

U.S. PATENT DOCUMENTS

| | | | |
|---|---|---|---|
| 4,628,896 | 12/1986 | Baynes | 126/25 R |
| 4,718,399 | 1/1988 | Shepherd | 126/25 R |
| 4,762,114 | 8/1988 | Blankekmeyer | 126/373 |
| 4,984,515 | 1/1991 | Pivonka | 99/449 |
| 5,033,448 | 7/1991 | Sandweg | 126/25 R |
| 5,062,408 | 11/1991 | Smith et al. | 126/41 R |
| 5,076,256 | 12/1991 | Raymer et al. | 126/41 R |
| 5,076,257 | 12/1991 | Raymer et al. | 126/41 R |
| 5,090,398 | 2/1992 | Raymer et al. | 126/41 R |
| 5,109,834 | 5/1992 | Collins et al. | 126/41 R |
| 5,140,973 | 8/1992 | Home | 126/41 R |
| 5,203,317 | 4/1993 | James | 126/41 R |
| 5,213,027 | 5/1993 | Tstotsos et al. | 99/339 |
| 5,307,789 | 5/1994 | Hewby | 126/50 |
| 5,341,793 | 8/1994 | Brown | 126/41 R |

*Primary Examiner*—James C. Yeung
*Attorney, Agent, or Firm*—Roberts & Brownell LLC

[57] ABSTRACT

A barbecue support structure is provided. The barbecue support structure includes a main support frame having at least two wheels at a lower end thereof and an upper support member defining at least two upper support surfaces having in a substantially horizontal plane. An intermediate mounting frame is connected to the upper support members, and includes a mechanism for receiving a barbecue unit. The upper support members and the intermediate mounting frame collectively include a mounting mechanism for removably mounting the intermediate mounting frame to the upper support members of the main support frame. The intermediate mounting frame may be remounted to the support members at one of a plurality of different positions on the support members. This allows differently configured barbecue units to be mounted to the intermediate mounting frame.

17 Claims, 4 Drawing Sheets

CONVERTIBLE BARBECUE SUPPORT FRAME

RELATED APPLICATION DATA

The present disclosure is a non-provisional application related to the provisional U.S. patent application entitled "Convertible Barbecue Support Frame", Ser. No. 60/005,435, filed Oct. 13, 1995.

FIELD OF THE INVENTION

The present invention is directed to a barbecue support structure. More particularly, the present invention relates to a support structure which is versatile and will support barbecue units and other structures of different sizes, shapes, and types.

BACKGROUND AND DESCRIPTION OF RELATED ART

Barbecues assemblies have been used in backyard settings, picnics, cookouts, family gatherings and a host of other social gatherings for decades. Such barbecue assemblies include, e.g., charcoal grill barbecues, gas grills, and electric grills, and usually comprise a grill unit having a grill and a grill housing, and are supported by a movable support frame. The movable support frame typically has wheels mounted to a lower end, and a handle for lifting the support frame up onto the wheels and moving the barbecue assembly from one location to another.

Typically the barbecue unit, which includes a grill and a grill housing, includes a predetermined support frame specifically designed and dimensioned to accommodate that specific barbecue unit. Therefore, the user is not able to upgrade the support stand or the barbecue unit to accommodate various other grills or other adjustments. To this end, the user must purchase a new barbecue assembly including both the support stand and the barbecue unit every time an update to the barbecue system is desired. As a result of this shortcoming, the user cannot modify the barbecue assembly to include new features or other systems as the user sees fit, e.g., shelving systems. The use of present barbecue systems also prevent the use of various barbecue grills or serving trays being mounted on a barbecue frame. Thus, present systems are of limited versatility.

Several inventors have attempted to devise methods for the construction of versatile barbecue systems that include detachable grills and shelves. For example, U.S. Pat. No. 5,341,793 to Brown discloses a combined drawer and cutting board attachment for a barbecue grill. The cutting board is mounted to the side arms of the barbecue grill and the drawer is mounted to the underside of the cutting board and consists of a snap on locking device so that the drawer will be locked in place and will be non-removable. This invention does not allow for future modification, and in fact, teaches the use of permanent non-removable shelves.

U.S. Pat. No. 5,140,973 to Home discloses a barbecue grill trolley that is retractable and foldable. There is no mechanism for adjustable shelving or other allowable modifications.

U.S. Pat. No. 5,062,408 to Smith et al. discloses a charbroiler having accessory spaces and doors. The charbroiler consists of interchangeable griddles and grids that sit on a set of rails displaced about a stainless steel cabinet. The cabinet also supports a ceramic briquette grate or a radiant heat plate. The invention does not teach removable barbecue grill assemblies, serving trays, or mounting shafts.

U.S. Pat. No. 5,109,834 to Collins et al. discloses a cart assembly for barbecue grills having left and right side members. The side members each have two legs which are attached by struts and are placed perpendicular to (and near the upper ends of) the legs. The right and left members are secured by shelves located near the bottom of the legs, a control panel, and a barbecue grill. The barbecue grill rests on the struts utilizing two integral studs that are permanently mounted. The studs extend upward into the barbeque grill and are secured thereto by bolts. The studs allow for rapid placement of the grill; but do not permit future modifications thereto.

On the other hand, certain barbecue assemblies are designed to utilize interchangeable shelving systems and barbecue grills. U.S. Pat. No. 5,213,027 to Tsotsos et al. discloses a barbecue grill assembly that has a removable cooking grid. Within the assembly are concealable working surfaces which slide to an extended position. This invention also teaches a combination draw and cooking grid elevator assembly, and a removable condiment rack. The invention does not teach any means for adding different barbecue grills or serving trays.

Other barbecue units that teach removable barbecue grill assemblies include U.S. Pat. No. 5,076,256 to Raymer et al. (the "'256 patent") and U.S. Pat. No. 5,076,257 to Raymer et al. (the "'257 patent"). The '256 patent discloses a barbecue grill with detachable accessory shelves and snap-in wheels. The shelves are pivotally mounted to the barbecue grill by supporting brackets. The brackets have locking means so as to lock the shelves in an upward or downward position. The user may elect to fasten a side grill instead of one of the pivotally mounted shelves.

The '257 patent discloses a barbecue grill with a pop-in front panel and a detachable condiment rack.

Additionally, U.S. Pat. No. 5,090,398 to Raymer et al. discloses a barbecue grill with detachable accessory shelves and a side burner.

U.S. Pat. No. 5,165,385 to Doolittle et al. discloses a barbecue grill assembly having a bowl shaped grill and a free standing lid that forms an oval shape when mated to the barbecue grill. A wire shelf for structural integrity and storage, as well as two hinged shelves are mounted on the barbecue support structure. The hinged shelves are detachably mounted on either side of the barbecue support structure, whereas the wire shelf is mounted on the bottom portion of the support structure between the legs.

U.S. Pat. No. 4,984,515 to Pivonka discloses a portable barbecue grill having a base and two sides (end portions). The two sides and the base are U-shaped. On the open ends of the U-shaped sides(bottom of grill frame) are slip sleeve connectors. The opened end of the base portion telescopes through the slip sleeve connectors, thereby forming a rigid frame. The U-shaped base portion is then screwed fixedly to the sleeve connectors. To provide for various size grills, the distance between the end portions is adjusted along the length of the base portion. In general, the distance is adjusted by slipping the base portion through the slip sleeve connectors to a greater or lesser depth. Handles for shelves are provided in the same fashion using slip sleeves.

U.S. Pat. No. 4,762,114 to Blankemeyer discloses a portable cooking apparatus with a removable work table. The cooking apparatus comprises a cooking vessel and brackets attached to the outside thereof The brackets are hollow tubular brackets in which hollow tubular legs telescope therein. A work table is attached to the outside of the vessel by brackets which, in turn, slip into the hollow legs.

3

In the preferred embodiment, a pin is inserted through the work table and bracket to secure the same together. This is not a mounting pin, but merely a pin and cotter assembly to fix the work table to the bracket.

Other barbecue systems that are designed to accommodate removable barbecue grill assemblies and serving trays are cumbersome and difficult to adjust. Typically, these units have to be completely disassembled and reassembled using a new configuration to accommodate the new shelving systems or barbecue grill. By way of example, the user may have to unbolt an entire barbecue assembly, including removing the grill assembly and legs, and thereafter rebuild the assembly to include the modifications. In this regard, U.S. Pat. No. 4,718,399 to Shepherd discloses an adjustable barbecue wagon for supporting a range of barbecue grills. This barbecue discloses a base and two end structures (sides) each having two legs. The wheel assembly consists of an axle that is mounted to the outside of the legs of the end structures. The base unit has holes that accommodate screws, which in turn, mount to the end structures. The end of the base unit near the wheel assembly has more holes which are in groups that correspond to different sizes of barbecues. Thus, the barbecue may be assembled using different groups of holes located on the base unit depending on the size and shape of the grill. The attachment means is not disposed on the top of the barbecue frame, and does not allow for the mounting of a serving tray. In general, the barbecue of this system is adjustable by reconfiguring the entire frame.

U.S. Pat. No. 4,628,896 to Baynes discloses a barbecue grill with horizontal-shiftable grids placed thereon. The invention is directed to a grill that is sidably mounted within the barbecue unit. The grill can be guided in the forward direction, or in an alternate embodiment, in a sideways direction (with relation to the front of the grill). To accomplish this, the barbecue grill is slidably mounted on rods by means of retainers.

U.S. Pat. No. 5,033,488 to Sandweg discloses a barbecue grill support frame that is mounted on a deck or patio rail. The support frame includes an upper frame, a pair of elongated side members, a circular frame member, and a pair of elongated leg members. The barbecue grill rests within the circular frame member. The upper frame is attached to a deck railing via a hooking mechanism. The support frame further includes open frame side panels which are removably mounted to the side members of the support frame.

What is needed to overcome the shortcomings of existing barbecue frames is a barbecue support frame or a support stand which is more versatile and universal to barbecue units of different types, shapes, and sizes, and can even be adapted to accommodate different cooking accessories including, for example, serving trays. The frame itself should have a means to mount several types of grills and shelving systems without the need to disassemble the entire barbecue assembly.

SUMMARY OF THE INVENTION

The present invention, through one or more of its various aspects and embodiments, is thus presented to bring about one or more objects and advantages such as the following.

An object of the present invention is to provide a versatile, universal barbecue support structure which can readily accommodate barbecue units of different sizes, shapes, and types.

A further object of the present invention is to provide a wheeled support structure having a mounting frame which can hold one or more serving trays and/or a barbecue unit.

Yet another object of the present invention is to provide a barbecue/serving tray support structure having lower support extremities that can be converted to receive either wheels or stationary support feet.

The present invention, therefore, is directed to a barbecue support structure which includes a main support frame and an intermediate mounting frame connected to an upper main portion of the main support frame. The main support frame may have at least two wheels at a lower end thereof and upper support members defining at least two upper support surfaces lying in a substantially horizontal plane. The intermediate mounting frame is connected to the upper support members and comprises a mechanism for receiving a barbecue unit comprising at least a basin and a grill. The upper support members and the intermediate mounting frame collectively comprise mounting means for mounting the intermediate mounting frame to the upper support members. The mounting means facilitate remounting of the intermediate mounting frame to the support members at a plurality of different positions on the support members, in order to mount differently configured barbecue units the intermediate mounting frame.

The barbecue support structure may comprise a barbecue unit mounted to the barbecue support structure with the use of the intermediate mounting frame, or it may comprise a serving tray mounted to the barbecue support structure by means of the intermediate mounting frame. Accordingly, the barbecue support structure may be converted from a barbecue assembly to a serving cart having a serving tray mounted on top of a movable support frame. The support structure may further include means provided at lower extremities of the support frame for receiving either wheels or stationary support feet.

In accordance with another aspect of the present invention, the main support frame comprises two side portions for mounting substantially horizontally positioned serving trays at each side of the main support frame.

In accordance with a further aspect of the present invention, the main support frame may comprise four vertically arranged main legs connected to each other with both broadwise framing members and lengthwise framing members to form a box-like support frame. At one side of the boxlike support frame, two wheels may be provided, each wheel being movably mounted to the lower extremity of a vertically arranged main leg. The lower extremities of the two remaining main legs may comprise stationary support feet that contact the surface upon which the main support frame rests.

BRIEF DESCRIPTION OF THE DRAWINGS

The present invention is further described in the detailed description that follows by reference to a plurality of drawings by way of a non-limiting exemplary embodiment of the present invention, with like reference numerals in the drawings representing similar parts throughout the several views of the drawings, and wherein.

DETAILED DESCRIPTION OF EXEMPLARY EMBODIMENTS

Figure 1:
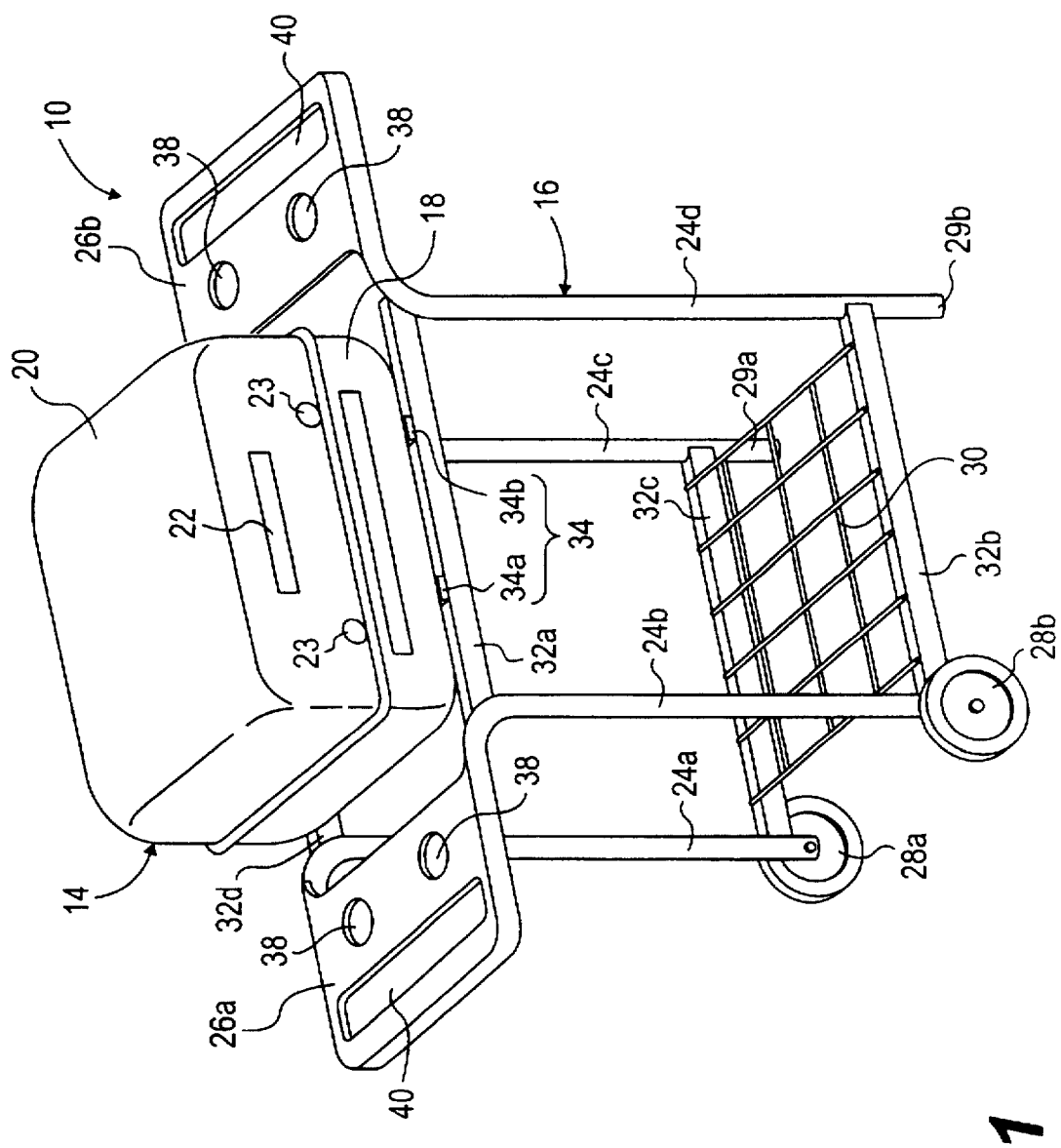
FIG. 1 is a perspective view of a barbecue assembly, including a barbecue unit and a barbecue support structure.

Referring now to the drawings in greater detail, FIG. 1 illustrates an example embodiment of a barbecue assembly 10. Barbecue assembly 10 includes a barbecue unit 14 mounted on a support structure 16. Support structure 16 comprises a main support frame with wheels movably mounted to a lower portion thereof and an intermediate mounting frame 34 connected to upper support members of the main support frame. More specifically, in the embodiment of FIG. 1, support structure 16 comprises a main support frame which includes four substantially vertical main legs 24a, 24b, 24c, and 24d. A first pair 24a, 24b of the main legs forms a first left side of the main support frame, and a second pair 24c, 24d of the main legs forms a right side of the main support frame of FIG. 1. A pair of wheels 28a, 28b are movably mounted to lower end extremities of the left main legs 24a, and 24b, respectively; while the lower end extremities of right main legs 24c, 24d comprise support feet 29a, 29b, respectively.

In the embodiment illustrated in FIG. 1, the four main legs 24a-24d are connected to each other to form a strong main support frame. They are connected to each other in the broadwise direction with broadwise framing members 32a, 32b, 32c, and 32d. Main legs 24a-24d are connected to each other in the lengthwise direction with a reinforcement lattice structure 30, at a lower end of the main legs, and with an intermediate mounting frame 34 at an upper end of main legs 24a-24d. A front lower substantially horizontal broadwise framing member 32b is connected at one end to a lower portion of left front main leg 24b and at another end to a lower portion of right front main leg 24d. A back lower substantially horizontal broadwise framing member 32c is connected at its one end to a lower portion of left rear main leg 24a and at its other end to a lower portion of right rear main leg 24c. An upper front substantially horizontal broadwise framing member 32a is connected at one end to a top portion of left front main leg 24b and at its other end to a top portion of right front main leg 24d. An upper back substantially horizontal broadwise framing member 32d is connected at one end to a top portion of left rear main leg 24a and at its other end to a top portion of right rear main leg 24c.

In order to further reinforce the main support frame in a lengthwise direction, a reinforcement lattice structure 30 is provided at a lower end of the main support frame, and intermediate mounting frame 34 is provided at an upper end of the main support frame. In addition, the left pair of main legs 24a, 24b may be part of the same integral bar or conduit having a bridging portion (not shown) which forms a bridge from a top portion of a left rear main leg 24a to a top portion of a left front main leg 24b. Similarly, the right pair of main legs 24c, 24d may be integrally formed, having a bridging portion forming a bridge from a top portion of right rear main leg 24c to a top portion of a right front main leg 24d.

The support structure 16 of FIG. 1 further comprises left and right side trays 26a, 26b, each of which is connected to and extends laterally from a top portion of one of the pair of left main legs 24a, 24b and the pair of right main legs 24c, 24d. Left side tray 26a extends out laterally to the end of support structure 16, and right side tray 26b extends laterally to the right of support structure 16. Each of the side trays 26a, 26b may be provided with indentations, including, e.g., a cup holder recess 38 and a rectangular recess 40, in order to help hold items on side trays 26a, 26b, such as cups, cooking utensils, and any other desired items that will fit in the provided recesses.

Side trays 26a, 26b may be connected to the upper ends of main legs 24a-24d in any appropriate manner so that they are secure and strong enough to support items thereon. Side trays 26a, 26b may be formed with plastic using a vacuum molding process.

The barbecue unit 14 shown in FIG. 1 is mounted on support structure 16 and generally includes a basin 18 and a hinged cover 20. Basin 18 has provided therein a grill (not shown) for supporting food items as they are cooked within barbecue unit 14. A cover handle 22 is connected to a front side surface of hinged cover 20, to allow a user to grasp cover hand 22 and lift hinged cover 20 upward in order to gain access to the grill (not shown). A pair of grill-positioning levers 23 are shown, which may be coupled to a mechanism (not shown) for adjusting the position of the grill (not shown) provided in the grill basin 18.

As noted above, support structure 16 includes an overall main support frame which generally comprises a set of main legs 24a-24d and a plurality of broadwise and lengthwise reinforcement members for holding the set of main legs at fixed positions in order to form a rigid and secure support frame. The support structure 16 further includes an intermediate mounting frame 34 connected to upper support members of the main support frame. Intermediate mounting frame 34 receives and mounts barbecue unit 14 to barbecue support structure 16.

In the embodiment of FIG. 1, the upper support members, to which intermediate mounting frame 34 is connected, comprise upper broadwise framing members 32a, 32d. By providing an intermediate mounting frame, a barbecue unit can be connected directly to the intermediate mounting frame rather than directly to the upper support members of the main support frame. Accordingly, the intermediate mounting frame can be provided with structure to allow it to mount differently configured barbecue units of different sizes, shapes, and types. The intermediate mounting frame can even be configured to mount a serving tray or other object, instead of a barbecue unit, to the main support frame.

Figure 2:
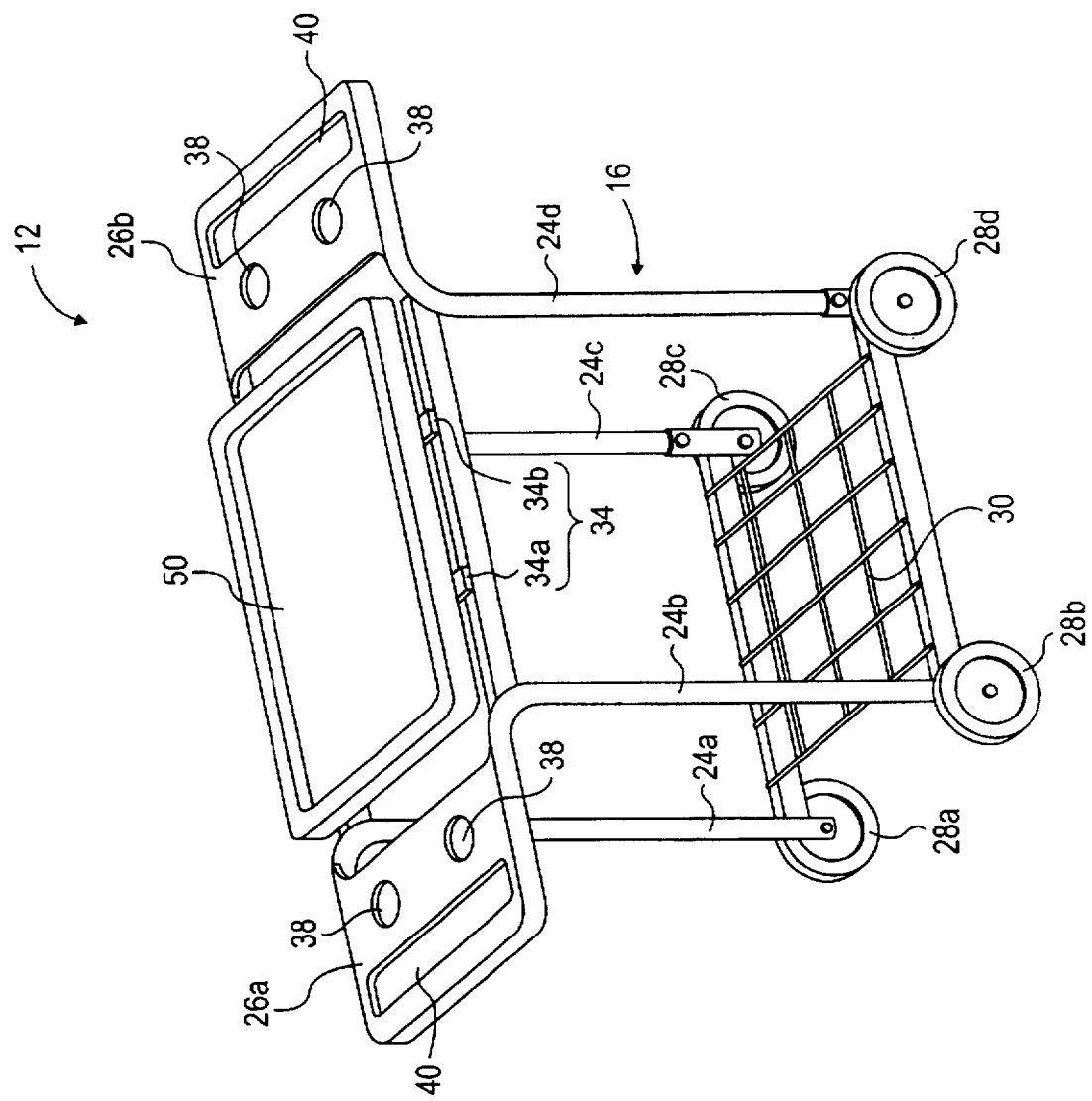
FIG. 2 is a perspective view of a barbecue support structure converted into a serving cart having four wheels and a substantially horizontally positioned serving tray.

FIG. 2 is a perspective view of a serving cart assembly 12 formed with a barbecue support structure 16 and an elongated serving tray 50 mounted upon an intermediate mounting frame 34. The embodiment of FIG. 2 is substantially the same as the embodiment of FIG. 1, except that an elongated serving tray 50 is mounted on intermediate mounting tray 34 instead of a barbecue unit 14, and the lower extremities of the right pair of main legs 24c, 24d have wheels 28c, 28d instead of stationary support feet 29a, 29b. The lower extremities of the right pair main legs 24c, 24d comprise mechanisms for modifying the lower extremities to comprise either stationary support feet or wheels.

Figure 3:
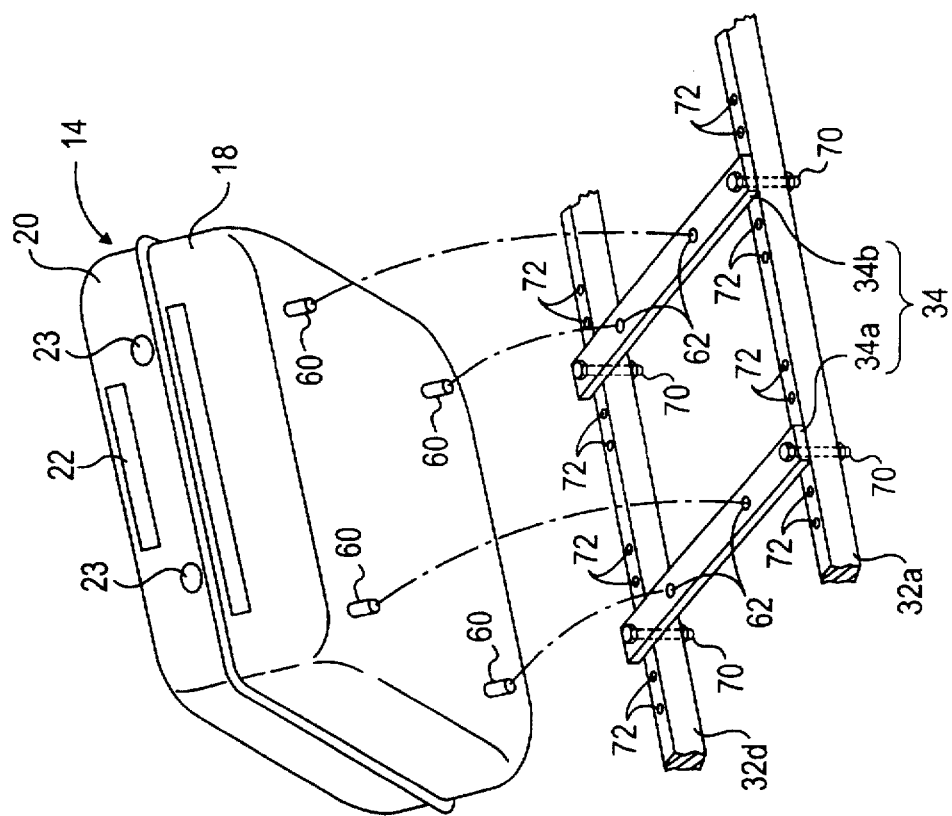
FIG. 3 is a partial exploded view of a barbecue unit in position for being mounted on an intermediate mounting frame which is connected to upper support members of a main support frame.

FIG. 3 illustrates a perspective view of a barbecue unit 14 in relation to an intermediate mounting frame 34 which is mounted to a support structure. This figure is provided to show the structure of the illustrated intermediate mounting frame 34 in more detail, and to explain the manner in which a barbecue unit 14 (or a serving tray 50 as shown in FIG. 2) can be mounted to such an intermediate mounting frame 34.

In the specific embodiment of FIG. 3, intermediate mounting frame 34 comprises a plurality of (two) elongated mounting members 34a, 34b, each of which extends from a top surface of a front broadwise framing member 32a to a top surface of a rear broadwise framing member 32d. Intermediate mounting frame 34 may be removably mounted to front and rear broadwise framing members 32a, 32d in any secure manner. In the illustrated embodiment fastening means are provided which include nut/bolt fastening assemblies 70. Nut/bolt fastening assemblies 70 are inserted into bores provided at the ends of each mounting member 34a, 34b and are further inserted into certain ones of a plurality of remounting bores 72 arranged along the respective front and rear broadwise framing members 32a, 32d. A plurality of mounting bores 72 are distributed along the longitudinal direction of each broadwise framing member 32a, 32d, each remounting bore 72 having a central axis which is substantially vertical and intersects a central longitudinal axis of its respective broadwise framing member.

A bottom portion of barbecue unit 14 is provided with a plurality of fasteners, shown as threaded mounting shafts 60 in the embodiment of FIG. 3. Threaded mounting shafts 60 are positioned on the bottom surface of barbecue unit 14 so that they will be aligned with mounting bores 62 provided within mounting members 34a, 34b. In the illustrated embodiment, four threaded mounting shafts 60 protrude downward from the lower surface of barbecue unit 14, and four corresponding vertically arranged bores 62 are provided in mounting members 34a, 34b. In order to securely mount barbecue unit 14 to intermediate mounting frame 34, threaded mounting shafts 60 may be inserted through mounting bores 62, and an appropriate threaded connector, such as a nut, can be used to securely mount barbecue unit 14 to intermediate mounting frame 34.

A serving tray or other desired object may be similarly mounted to intermediate mounting frame 34, e.g., as shown in FIG. 3. By way of example, as shown in FIG. 3, a serving tray may be provided with threaded mounting shafts 60 which are aligned with and correspond to mounting bores 62 provided within mounting members 34a, 34b. Thus, in order to mount a serving tray to intermediate mounting frame 34, the threaded mounting shafts 60 of the serving tray may be inserted through the mounting bores 62, and connectors, such as nuts, may be attached to the lower ends of threaded mounting shafts 60 in order to secure the connection.

Threaded mounting shafts 60 may be welded or otherwise integrally secured to a lower surface of the object (e.g. barbecue unit 14 or serving tray 50) to be mounted to intermediate mounting frame 34. Alternatively, threaded mounting shafts 60 may comprise the shafts of screws or bolts inserted through holes in a bottom wall of basin 18 of barbecue unit 14, or in a bottom panel of a serving tray 50. A mounting bracket may be welded or otherwise fixed to the lower surface of the object to be mounted, and the mounting bracket may be provided with threaded mounting shafts for mating with mounting bores 62 provided within intermediate mounting frame 34. Intermediate mounting frame 34 may be configured differently than the intermediate mounting frame shown in the illustrated embodiments. For example, the intermediate mounting frame may comprise one unitary bracket or frame structure which can be attached to upper support members of the main support frame of barbecue support structure 16 and which will facilitate mounting and removing of different types of barbecue units 14.

In accordance with one aspect of the present invention, upgrade kits may be provided for upgrading a barbecue stand or cart used to support a particular barbecue unit, or for upgrading the barbecue unit itself. For example, in order to upgrade a barbecue unit, a new barbecue unit may be sold along with an intermediate mounting frame that matches the new barbecue unit in size, shape, and configuration, i.e., that has the appropriate connecting mechanisms for mounting the new barbecue unit to the barbecue support structure 16. In another type of kit, the consumer may upgrade the barbecue support structure used to support the barbecue unit.

For this purpose, a convertible barbecue cart/support assembly may be sold separately from the barbecue unit. The separately-sold barbecue cart/support assembly may be provided with means for receiving an intermediate frame to which a barbecue unit or another appropriate object can be removably mounted.

In the embodiment of FIG. 2, barbecue support structure 16 can be converted into a serving cart having one or more serving trays mounted thereon, such as side serving trays 26a, 26b and central elongated serving tray 50. Barbecue structure 16 may be further converted into a cart having wheels at every pedal extremity of the overall support structure 16. The lower extremities of a right pair of main legs 24c, 24d can be converted to either have stationary support feet 29a, 29b (as in FIG. 1), or movable wheels 28c, 28d (as shown in FIG. 2). The embodiment may be further modified so that each of the four lower extremities of the overall barbecue support structure 16 can be converted to either comprise a stationary support foot or a movable wheel.

Figure 4:
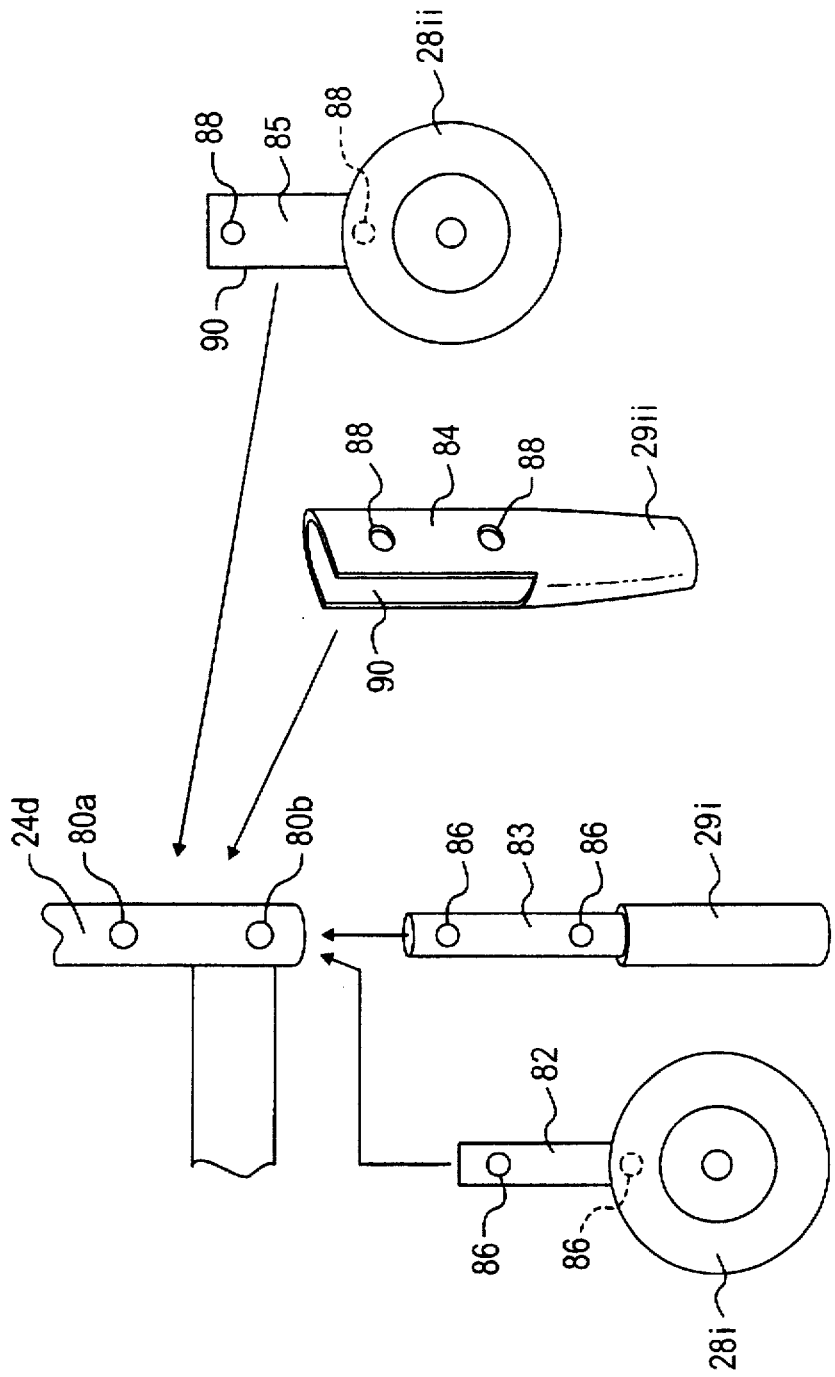
FIG. 4 shows a lower extremity of a main leg of a main support frame, together with several optional support foot structures which may be detachably connected thereto.

FIG. 4 shows a right front lower extremity of a barbecue support structure 16 as shown in FIG. 2, with a mechanism for converting the lower extremity to be either a fixed support foot 29 or a wheel 28. In the exemplary embodiment of FIG. 4, the lower cylindrical portion of a right front main leg 24d is provided with substantially horizontally arranged holes 80a, 80b that extend from a front side to a back side of main leg 24d. Two types of connecting mechanisms are shown in FIG. 4. A first type of connecting mechanism is used to mount either a wheel 28i or a stationary support foot 29i to the right front main leg 24d, and a second type of exchange mechanism is used to mount either a wheel 28ii or a stationary foot 29ii to the right front main leg 24d. In the first type of connecting mechanism, the bottom end of right front main leg 24d is provided with a hollow opening which will receive a shaft 82 connected to wheel 28i or a shaft 83 connected to stationary support foot 29i. When a shaft is inserted into the hollow opening of right front main leg 24d, the holes 80a and 80b will become aligned with corresponding holes 86 of shaft 82 of wheel 28i or shaft 83 of stationary support foot 29i.

In the second type of connecting mechanism illustrated in FIG. 4, stationary support foot 29ii and wheel 28ii are each provided with a substantially identical mounting mechanism 84 and 85. Each of mounting mechanisms 84, 85 is provided with holes 88 that correspond to and are aligned with holes 80a, 80b of right front main leg 24d, and has a C-shaped cross section which allows right front main leg 24d to be inserted into an opening 90. When right front main leg 24d is inserted into opening 90, holes 80a, 80b are aligned with holes 88 of either a stationary support foot 29ii or a wheel 28ii. When a wheel or a stationary support is completely mated with the lower portion of front right main leg 24d in any of the configurations illustrated in FIG. 4, the holes 86 or 88 will be in alignment with the holes 80a, 80b of main leg 24d. An appropriate connecting shaft (e.g., a nut/bolt fastener) may be inserted through each of the upper and lower holes to secure either a wheel or a stationary support foot to the overall barbecue support structure 16.

While the invention has been described with reference to example embodiments and certain aspects of those embodiments, it is understood that the words used herein are words of illustration, rather than words of limitation. Changes may be made while achieving certain objects and advantages of the present invention without departing from the scope and spirit of the invention in its various aspects. Although the invention has been described with reference to particular means, materials, and embodiments, the invention is not intended to be limited to the particulars herein. Rather, the invention extends to all equivalent structures, methods, and uses.

I claim:

1. A convertible barbecue support frame comprising:

(a) a main support frame with a front end, a rear end, a left side, a right side, a top end, and a bottom end, comprising: four substantially vertical main legs defined as a left front leg, a left rear leg, a right front leg, and a right rear leg, and where each substantially vertical main leg has an upper end and a lower end;

(b) two substantially horizontal upper broadwise framing members, each with a left end, a right end, and a top surface, defined as a front upper broadwise framing member and a rear upper broadwise framing member, where the left end of the front upper broadwise framing member is connected to the upper end of the left front leg;

the right end of the front upper broadwise framing member is connected to the upper end of the right front leg;

the left end of the rear upper broadwise framing member is connected to the upper end of the left rear leg; and the right end of the rear upper broadwise framing member is connected to the upper end of the right rear leg;

(c) a plurality of elongated mounting frame members, each with a forward end and a rearward end, where
   each forward end is connected to the top surface of the front upper broadwise framing member; and
   each rearward end is connected to the top surface of the rear upper broadwise framing member; and (d) two substantially horizontal lower broadwise framing members, each with a left extremity and a right extremity, defined as a front lower broadwise framing member and a rear lower broadwise framing member, where the left extremity of the front lower broadwise framing member is connected to the lower end of the left front leg;

the right extremity of the front lower broadwise framing member is connected to the lower end of the right front leg;

the left extremity of the rear lower broadwise framing member is connected to the lower end of the left rear leg; and the right extremity of the rear lower broadwise framing member is connected to the lower end of the right front leg.

2. A convertible barbecue support frame according to claim 1 further comprising a wheel removably mounted to the lower end of each substantially vertical main leg.

3. A convertible barbecue support frame according to claim 1 further comprising a wheel removably mounted to the bottom end of each substantially vertical front and left rear leg.

4. A convertible barbecue support frame according to claim 3 further comprising a support foot removably mounted to the lower end of each substantially vertical right front and right rear leg.

5. A convertible barbecue support frame according to claim 1 where the left two substantially vertical main legs are formed from one integral bar with a bridging portion connecting the respective upper ends thereof, and the right two substantially vertical main legs are formed from one integral bar with a bridging portion connecting the respective upper ends thereof.

6. A convertible barbecue support frame according to claim 5 where the bridging portion of the left two substantially vertical main legs extending substantially horizontally out from the left side of the main support frame forming a left bridging portion;

the bridging portion of the right two substantially vertical main legs extends substantially horizontally out from the right side of the main support frame forming a right bridging portion; and wherein the left and right bridging portions each support a side tray.

7. A convertible barbecue support frame according to claim 6 where the side trays each comprise indentations for holding items on the side trays.

8. A convertible barbecue support frame according to claim 1 where the elongated mounting frame members extend substantially horizontally from and substantially perpendicular to the two substantially horizontal upper broadwise framing members.

9. A convertible barbecue support frame according to claim 1 where each elongated mounting frame member further comprises a plurality of mounting bores extending therethrough.

10. A convertible barbecue support frame according to claim 9 where a barbecue unit is mounted on the elongated mounting frame members.

11. A convertible barbecue support frame according to claim 9 where a central tray is mounted on the elongated mounting frame members.

12. A convertible barbecue support frame according to claim 10 further comprising a plurality of fastening means which depend downward from the barbecue unit for inserting through the plurality of bores extending through the elongated mounting frame members.

13. A convertible barbecue support frame according to claim 11 further comprising a plurality of fastening means which depend downward from the central tray for inserting through the plurality of bores extending through the elongated mounting frame members.

14. A convertible barbecue support frame according to claim 12 where the plurality of fastening means comprise threaded mounting shafts for engagement with nuts.

15. A convertible barbecue support frame according to claim 13 where the plurality of fastening means comprise threaded mounting shafts for engagement with nuts.

16. A convertible barbecue support frame according to claim 1 further comprising a reinforcement lattice connected to the two substantially horizontal lower broadwise framing members.

17. A convertible barbecue support frame according to claim 1 where the two substantially horizontal upper broadwise framing members and the plurality of elongated mounting frame members comprise a unitary frame structure for attaching to the four substantially vertical main legs.

* * * * *